United States Patent [19]

Mendelsohn et al.

[11] 4,367,425

[45] Jan. 4, 1983

[54] IMPREGNATED HIGH VOLTAGE SPACERS FOR USE WITH RESIN FILLED HOSE BRACING SYSTEMS

[75] Inventors: Morris A. Mendelsohn, Wilkins Township, Allegheny County; Francis W. Navish, Jr., East Pittsburgh, both of Pa.

[73] Assignee: Westinghouse Electric Corp., Pittsburgh, Pa.

[21] Appl. No.: 269,133

[22] Filed: Jun. 1, 1981

[51] Int. Cl.$^3$ .............................................. H02K 3/46
[52] U.S. Cl. .................................... 310/260; 525/126
[58] Field of Search ................ 310/260; 525/123, 127, 525/131, 126

[56] References Cited

U.S. PATENT DOCUMENTS 2,427,700  9/1947  Atkinson et al. .................. 174/103
2,749,460  6/1956  Action et al. ...................... 310/260
2,959,699  11/1960  Smith et al. ......................... 310/260

FOREIGN PATENT DOCUMENTS 48-20618  6/1973  Japan ................................. 525/123

Primary Examiner—Paul Lieberman
Assistant Examiner—Robert E. L. Sellers
Attorney, Agent, or Firm—D. P. Cillo

[57] ABSTRACT

A compatible, gellable, dual resin system useful for impregnating porous spacers between stator end windings of turbine generators is made from (A) a liquid diallyl isophthalate component comprising an admixture of liquid diallyl isophthalate monomer and solid diallyl isophthalate prepolymer, where the weight ratio of monomer:prepolymer is between about 1.5:1 and about 3.0:1, (B) an amount of chain forming isocyanate terminated polyurethane prepolymer effective to provide a chain network which physically interpenetrates the liquid diallyl isophthalate component, and prevents free flow of liquid diallyl isophthalate component, (C) a chain extender for the isocyanate terminated polyurethane prepolymer, and (D) a catalyst for the diallyl isophthalate component, where the resin system is curable with the application of heat.

5 Claims, 2 Drawing Figures

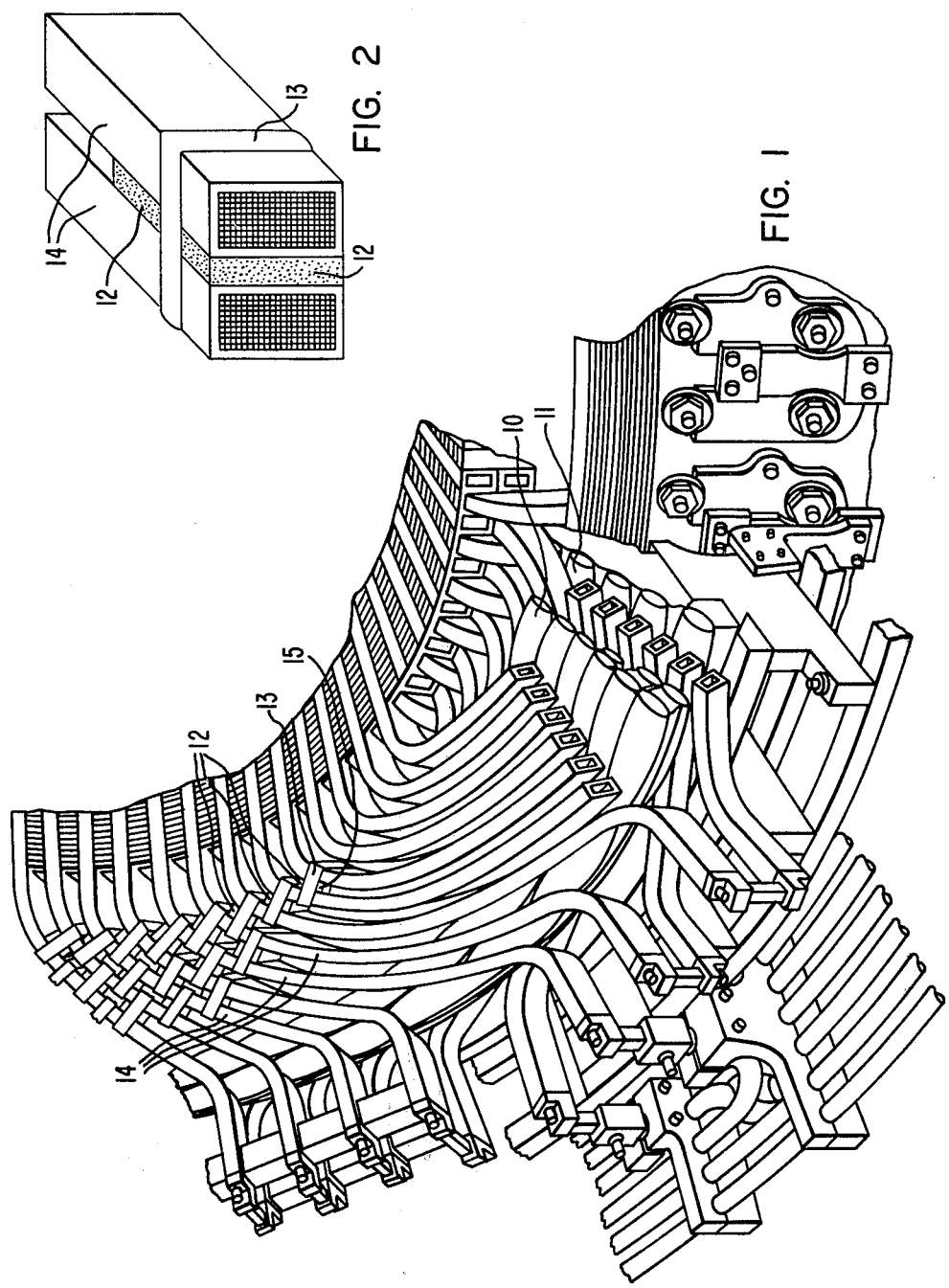

IMPREGNATED HIGH VOLTAGE SPACERS FOR USE WITH RESIN FILLED HOSE BRACING SYSTEMS

BACKGROUND OF THE INVENTION

Support systems for stator end windings of turbine generators must absorb vibration. The support system must control the forces which result from both steady-state and short-circuit conditions, and also allow controlled axial motion for thermal expansion. Atkinson et al., in U.S. Pat. No. 2,427,700, taught resin impregnated spacer blocks between adjacent end windings, to prevent end winding movement relative to one another during generator operation. The spacer blocks were made from a fibrous material, such as asbestos cloth, impregnated with a carbon filled phenolic resin.

Since the time of Atkinson et al., sophisticated bracing systems involving, in part, hoses filled with latent catalyzed epoxy resins, have been used between end turn layers. Prior to filling these hoses, the spaces between adjacent end turns within each end turn layer must be partially braced with resin impregnated stator end winding spacers. The use of resin filled hose bracing systems presents unique problems in formulating a suitable composition for impregnating the stator end winding spacers. The resin system must display a moderately low initial viscosity, have at least a 3-hour shelf life, meet toxicity standards, exhibit behavior of a non-running material of essentially solid form within one day of compounding, remain compliant for about 3 weeks, not drip on subsequent heating under pressure while displaying adequate flow so as to conform and bond to the windings, and cure at about 125° C. to give a heat distortion temperature of at least about 200° C.

No true B-stage system, such as an epoxy resin system, meets all of these requirements. What is needed is a resin system specially formulated to meet the unique demands required of stator end winding spacer impregnants in sophisticated resin filled hose bracing systems used in turbine generators.

SUMMARY OF THE INVENTION

The above problems have been solved and the above needs met, by providing a low viscosity impregnating resin which can be used with a porous substrate to provide stator end winding spacers. In its broadest aspect, the resin system of the invention comprises a compatible, gellable system of liquid diallyl isophthalate mixture, and an amount of chain forming isocyanate terminated polyurethane prepolymer effective to provide a chain network which physically interpenetrates and prevents free flow of the liquid diallyl isophthalate.

More specifically, the impregnating resin system comprises: (A) a mixture of liquid diallyl isophthalate monomer; and solid diallyl isophthalate prepolymer, having a weight average molecular weight of between about 200,000 and about 300,000 and contaning unreacted pendant allyl groups, in a weight ratio of monomer:prepolymer of between about 1.5:1 and about 3.0:1; (B) an amount of isocyanate terminated polyurethane prepolymer, prepared from a stoichiometric excess of diisocyanate and a polyol, having a weight average molecular weight of between about 700 and about 2,500, effective to provide between about 0.010 and about 0.020 equivalent of NCO group per 100 grams of diallyl isophthalate monomer plus diallyl isophthalate prepolymer, where the preferred diisocyanate component of the polyurethane prepolymer is selected from the group consisting of 2,4-tolylene diisocyanate; 2,6-tolylene diisocyanate; a mixture of 2,4-tolylene diisocyanate and 2,6-tolylene diisocyanate; and 4,4'-diphenyl methane diisocyanate used in about a 1.5 mole excess over the polyol; (C) an amount of chain extender selected from the group consisting of a polyol, containing active OH groups, when the polyurethane prepolymer contains 4,4'-diphenyl methane diisocyanate; and an aromatic diamine, containing active $NH_2$ groups, for the tolylene diisocyanate type polyurethane prepolymers described above, where the ratio of (NCO group equivalents per 100 parts of total diallyl isophthalate)/(either active OH group equivalents in the polyol or active $NH_2$ group equivalents in the diamine per 100 parts of total diallyl isophthalate), i.e., the ratio of equivalents of free isocyanate groups/equivalents of either hydroxyl or amine groups, is from about 0.95 to about 1.10; and (D) an amount of peroxide, such as t-butyl perbenzoate, effective to provide a catalytic effect on the diallyl isophthalate, where the resin system is curable with the application of heat.

The diallyl isophthalate prepolymer is necessary to reduce shrinkage and retard flow, but an excess of diallyl isophthalate prepolymer results in unsuitably high viscosities initially and after 3 hours. The meta bond position of the diallyl isophthalate is critical in providing low weight loss and high thermal stability. The urethane prepolymer provides long chain lengths between cross-links, and provides a suitable gel time while still allowing flow under pressure at elevated temperatures. Excess urethane plus chain extender results in unsuitably high viscosities after three hours. In the resulting impregnating resin, the polymerization of the urethane is sufficiently advanced over a period of 24 hours at 25° C. such that molecules of diallyl isophthalate are retained in an interpenetrating polyurethane polymer network. This resin admixture comprises two resin components which are compatible with each other but do not chemically react with each other, the polyurethane being used to physically prevent free flow of the diallyl isophthalate. As the resin cures, it develops a highly rigid structure.

BRIEF DESCRIPTION OF THE DRAWING

For a better understanding of the invention, reference may be made to the exemplary embodiments shown in the accompanying drawings, in which:

FIG. 1 shows a pictorial view of a portion of the end winding for water cooled stator coils in a turbine generator using a resin filled hose bracing system; and FIG. 2 shows an isometric view of a portion of FIG. 1 in section, to detail the spacers between the end windings.

DESCRIPTION OF THE PREFERRED EMBODIMENTS

Referring to the drawings, FIG. 1 shows one embodiment of a stator end winding spacer system in an electrical apparatus. Layers of resin filled hoses 10 and 11, are combined with resin impregnated spacers 12 and bonding tape 13, shown only in the top half of the drawing for clarity, to control motion between insulated stator end windings 14 during generator operation. The spacer 12 at, for example, position 15, in the end winding area or section of the generator, is shown in greater detail in FIG. 2. Here, the resin impregnated spacer is shown as a brace between a plurality of stator conductor coils in the end winding section of an electrical apparatus.

After the impregnated spacers 12 are inserted between and bound to the stator conductor coils 14, the hoses in the hose layers 10 and 11 are pumped full of catalyzed epoxy or other suitable resin. The resultant radial expansion of the hose bracing system forces the coil diamonds together, thereby compressing the impregnated spacers.

In order to function properly, the resin employed to impregnate the spacer must meet certain requirements. The freshly prepared resin, in addition to displaying low toxicity, has to exhibit a viscosity that would be sufficiently low for at least 3 hours after compounding, so that it would readily penetrate the spacer. The preferred viscosity after 3 hours from compounding is between about 50 stokes to about 120 stokes at 25° C.

After the spacer is filled with the impregnant, it is inserted between the coils at which time it is desirable that the liquid essentially solidify within a day at room temperature. However, it is important that the solidified resin exhibits compliant behavior for about 3 weeks, since that period may elapse until the hoses are pressurized with resin, and the spacers are required to undergo distortion without cracking. As the spacers are being heated while under pressure, it is essential that the resin should not become so fluid as to run out and drip, yet should display slight flow so that they will conform and adhere to the coils. On subsequent baking for several hours at 125° C., the resin, which exhibits behavior analogous to an elastomeric B-stage material, will convert to a fully cured material exhibiting a heat distortion temperature of at least about 200° C.

The porous, heat resistant substrate, into which the resin system is impregnated to provide the spacer is preferably a woven glass fiber, or fibrous felt material such as a Dacron (polyethylene terephthalate) pad. Any substrate material is useful, however, that is effective to allow resin impregnation, and compression and flexibility for insertion between conductors, while still resisting the heat of the environment into which it is placed. These substrate materials are usually about ¼ to ½ inch thick.

The resin used to impregnate the porous spacer substrate is an admixture of diallyl isophthalate monomer, diallyl isophthalate prepolymer, polyurethane prepolymer with matched polyol or amine chain extender and peroxide catalyst. The liquid diallylisophthalate monomer has the following meta bonded chemical structure:

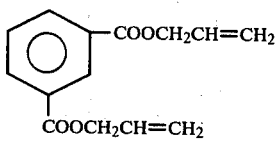

Diallyl phthalate, where the pendant groups are next to each other on the ring structure, is not useful in this invention because such close attachment allows intramolecular reaction which can result in polymer chain cleavage resulting in polymer degradation and high weight loss upon thermal aging.

The useful solid diallyl isophthalate prepolymer has a weight average molecular weight of between about 200,000 and about 300,000, and contains unreacted pendant allyl groups. A typical chemical structure for the prepolymer is shown below:

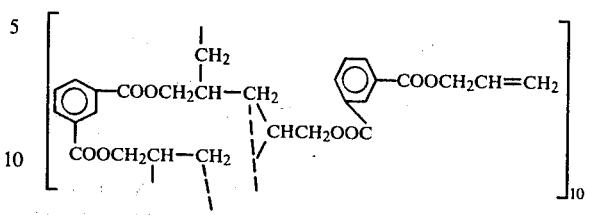

Such prepolymers have high heat deflection and high continuous heat resistance temperatures. The useful weight ratio of liquid diallyl isophthalate monomer:-solid diallyl isophthalate prepolymer is between about 1.5:1 and about 3.0:1, preferably between about 2.0:1 and about 2.5:1. This mixture of monomer and prepolymer is essential. The solid prepolymer when used within the above described range reduces shrinkage and retards flow. Over about 3.0 parts prepolymer results in unsuitably high viscosities. Under about 1.5 parts prepolymer results in excess dripping and resin loss.

Urethanes are formed by the reaction of an isocyanate and an alcohol:

By the same reaction, polyols will react with diisocyanates to yield polyurethanes. The diisocyanates tie the polyols into a polymeric structure by the reaction of their terminal NCO groups with the OH groups of the polyol. Diisocyanates can be produced by a variety of methods well known in the art. For example tolylene diisocyanate can be produced by nitration of toluene, to yield both 2-nitrotoluene and 4-nitrotoluene. These are further nitrated, the 4-isomer yielding 2,4-dinitrotoluene, and the 2-isomer yielding both a 2,4- and a 2,6-dinitro toluene. The nitro compounds are then reduced to amines which can then be treated with phosgene to form a carbamoyl chloride. This carbamoyl chloride can then be decomposed to produce a diisocyanate:

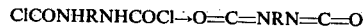

For a detailed description of diallyl isophthalates, polyurethanes, and diisocyanates, reference can be made to J. A. Brydson, *Plastics Materials*, 1966, chapters 21.3, 23.1 and 23.2 respectively.

Examples of suitable isocyanate terminated polyurethane prepolymers are those prepared by reacting about 2 moles of 2,4-tolylene diisocyanate with 1 mole of a polyoxytetramethylene diol having a molecular weight of about 1,000, to produce an isocyanate terminated prepolymer having an isocyanate equivalent weight of about 670, and containing polyoxytetramethylene chain segments. In any system employing tolylene diisoacyanate, there will be essentially no unreacted molecules of the diisocyanate, and the unreacted isocyanate end groups will comprise from about 4 wt.% to about 20 wt.% of the prepolymer. Another suitable polyurethane prepolymer can be prepared by treating about 2.5 moles of 4,4'-diphenyl methane diisocyanate with 1 mole of a polyoxytetramethylene diol having a molecular weight of about 1,000, to produce an isocyanate terminated polyurethane prepolymer having an isocyanate equivalent weight of about 565, and containing polyoxytetramethylene chain segments between the terminal isocyanate groups. Both of these materials have unreacted isocyanate which can be later bonded to form a polymer structure.

Prepolymers prepared from 4,4'-diphenyl methane diisocyanate preferably contain unreacted and thus "free" diisocyanate in addition to the isocyanate terminated diol. In the above example in which 2.5 moles of 4,4'-diphenyl methane diisocyanate were employed per mole of polyoxytetramethylene diol, 2.0 moles of this diisocyanate will react with 1.0 mole of diol to give the isocyanate terminated prepolymer. In addition, 0.5 mole of the 4,4'-diphenyl methane diisocyanate in the above example remains unreacted and dissolved in the prepolymer. On the other hand, it is preferred that prepolymers prepared with any of the tolylene diisocyanate isomers do not contain any "free" or completely unreacted diisocyanate. The excess tolylene diisocyanate is employed to provide the prepolymer with the two terminal isocyanate groups. Thus it is preferred that the tolylene diisocyanate based prepolymers are prepared using a diisocyanate to diol mole ratio which does not exceed 2.0. As is known in the art, the tolylene diisocyanate terminated prepolymer usually requires a diamine as the preferred chain extender, whereas the diphenyl methane diisocyanate terminated prepolymer usually requires a polyol as the preferred chain extender.

Isocyanate terminated polyurethane prepolymers useful in the impregnating resins of this invention have a weight average molecular weight of between about 700 and about 2,500, and must provide between about 0.010 and about 0.020 equivalent of NCO group per 100 grams of total diallyl isophthalate, i.e., diallyl isophthalate monomer plus diallyl isophthalate prepolymer. Under 0.010 equivalent of NCO, the viscosity of the resin increases at too slow a rate over a 3-hour period, allowing dripping and resin loss. Over 0.020 equivalent of NCO, the viscosity of the resin increases at too high a rate over a 3-hour period. This also results in high water absorption, poor hydrolytic stability, higher dissipation factor and dielectric constant values, and may prevent good conformity of the resin matrix at a later date when the hoses, shown in FIG. 1 of the drawings, are expanded. The isocyanate terminated prepolymer must be present in an amount effective to provide a chain network which physically interpenetrates the diallyl isophthalate mixture and prevents free flow of the diallyl isophthalate mixture.

The isocyanate component of the polyurethane prepolymer is selected from the group consisting of 2,4-tolylene diisocyanate (2,4-TDI); 2,6-tolylene diisocyanate (2,6-TDI); a mixture of 2,4-tolylene diisocyanate and 2,6-tolylene diisocyanate usually in a mole ratio of 2,4-TDI:2,6-TDI of 80:20 or 65:35; 4,4'-diphenyl methane diisocyanate, used in amounts as described in the example herein above; 4,4'-dicyclohexylmethane diisocyanate; 1,6-hexane diisocyanate; 1,6-cyclohexane diisocyanate; isophorone diisocyanate; 1,4-naphthalene diisocyanate; 1,5-naphthalene diisocyanate; and 2,7-naphthalene diisocyanate. The first four listed, consisting of the 2,4- and 2,6-tolylene diisocyanate and their mixtures and 4,4'-dyphenyl methane diisocyanate being most preferred. The polyol component of the polyurethane prepolymer can consist of a high molecular weight polyol such as castor oil and its derivatives, but is preferably a polyether polyol such as a polyoxypropylene diol or a polyoxytetramethylene diol, and the like. While polyester polyols can be used, they are less preferred. Most preferably the polyol is a polyoxytetramethylene diol.

It is necessary that the rate of polymerization of the urethane component be slow enough over a 3-hour period to provide a sufficiently long resin pot-life, so that workers can fill the spacer pads with the impregnating resin and then properly insert the resin filled pads between the end windings of the generator stator coils. It is also necessary that the rate of polymerization be sufficiently rapid so that the polyurethane rapidly entraps the solution of diallyl isophthalate monomer and the diallyl isophthalate prepolymer. Since the rate of polymerization correlates directly with an increase in viscosity of the impregnant, it has been found that the most favorable rate of polymerization of the urethane component corresponds to the approximate doubling of the viscosity of the impregnant within three hours of combining the components, with a maximum viscosity of about 120 stokes at 25° C. after three hours of component mixing.

The most useful chain extenders for most of the isocyanate terminated polyurethane prepolymers described herein above is an aromatic diamine having at least two electron withdrawing groups selected from carbonyl ($C=O$) and chlorine in the molecule, attached either to the aromatic ring or a carbon attached directly to the aromatic ring, such as, for example isobutyl-4-chloro-3,5-diaminobenzoate, having an amine equivalent weight of about 121, and preferably trimethylene glycol di-p-aminobenzoate, having an amine equivalent weight of about 157; with the exception that the isocyanate terminated urethane prepolymer containing 4,4'-diphenyl methane diisocyanate requires a polyol chain extender, such as, for example hydroquinone di-($\beta$-hydroxyethyl) ether; ethylene glycol; 1,2-propanediol; 1,3-propanediol; 1,5-pentanediol; 1,4-butanediol; 1,3-butanediol; 1,2-butanediol; 2,2-butanediol; 2,3-butanediol, their mixtures, and the like. A triol, such as for example, trimethylol propane and the like can also be used in combination with the diol as a chain extender.

The chain extender must be added in an amount effective to allow formation, over a 24-hour period at 25° C., of a polyurethane polymer matrix network which physically interpenetrates the liquid diallyl isophthalate. When polyol is used as a chain extender, the ratio of (NCO group equivalents per 100 parts total diallyl isophthalate)/(active OH group equivalents in the polyol per 100 parts diallyl isophthalate) is from about 0.95 to 1.10, and when diamine is used as a chain extender, the ratio of (NCO group equivalents per 100 parts of total diallyl isophthalate)/(active $NH_2$ group equivalents in the amine per 100 perts diallyl isophthalate) is from about 0.95 to 1.10.

Examples of suitable catalysts for the diallyl isophthalate include effective amounts of peroxide catalysts, such as benzoyl peroxide, methyl ethyl ketone peroxide, cyclohexanone peroxide, and preferably t-butyl perbenzoate.

The combination of these ingredients provides a unique system which contains two different type resins. These resins are compatible with each other, and while they do not chemically react, they physically interact so that the minor amount of polyurethane chain structure intertwines, penetrates and encloses the major portion of diallyl isophthalate, to provide a flexible type matrix preventing free flow of the diallyl isophthalate. An initial low viscosity, a 3-hour working time at 25° C., the behavior of a flexible solid within 24 hours of compounding, the ability to remain compliant at 25° C. for several weeks-analogous to an elastomeric "B" stage, to not drip on subsequent heating under pressure while displaying adequate flow so as to conform and bond to the windings and cure at 125° C. to give a heat distortion temperature of at least 200° C., are all achieved with this resin system.

EXAMPLE 1

Four resin formulations were made. Two formulations, Samples (A) and (B), used tolylene diisocyanate in the polyurethane prepolymer, and two other formulations, Samples (C) and (D), used 4,4'-diphenyl methane diisocyanate in the polyurethane prepolymer. In Sample (A), trimethylene glycol di-p-aminobenzoate chain extender (TGA), having an amine equivalent weight of 157 and a melting range of 125° C. to 128° C., was initially added to diallyl isophthalate monomer (DAIP) while heating on a hot plate until the TGA melted and dissolved in the DAIP. Then t-butyl perbenzoate catalyst (t-BPB) was mixed in. The isocyanate terminated prepolymer (ITP667) was then blended into the mixture. The diallyl isophthalate prepolymer (DAIP-PP), having a softening range of 85° C. to 115° C. and an iodine number of about 57, was dissolved in the admixture. The ITP667, which contained polyoxytetramethylene chain segments and had an isocyanate equivalent weight of about 667, was prepared from two moles of 2,4-tolylene diisocyanate and one mole of polyoxytetramethylene diol having a molecular weight of about 1,000.

In Sample (B), the same ingredients and method were used except that the isocyanate terminated prepolymer (ITP444) used, had an isocyanate equivalent weight of about 444, contained polyoxytetramethylene chain segments, and was prepared from an 80:20 weight ratio of 2,4-tolylene diisocyanate to 2,6-tolylene diisocyanate, and polyoxytetramethylene diol having a molecular weight of about 540.

In Sample (C), the t-BPB catalyst was initially dissolved in the DAIP. Then a mixture of 1,4-butanediol (1,4-BD) and trimethylol propane (TMP) polyol chain extenders were added to the mixture followed by DAIP-PP and finally the isocyanate terminated prepolymer (ITP565). The ITP565, which contained polyoxytetramethylene chain segments and had an isocyanate equivalent weight of about 565, was prepared from 2.5 moles of 4,4'-diphenyl methane diisocyanate and 1.0 mole of polyoxytetramethylene diol having a molecular weight of about 1,000.

In Sample (D), the same ingredients and method were used except that the chain extender consisted solely of 1,4-BD.

These sample composition solutions were then measured for initial viscosity, and viscosity after 3 hours, as determined in a Gardner bubble viscometer and converted to Stokes. Specimens were then prepared by dipping sections of Dacron felt spacer substrates ⅛"×2"×4" into the sample composition solutions. After soaking for about one minute the impregnated specimens were removed and suspended. After being suspended for 24 hours the saturated felt was squeezed manually to determine whether gellation, i.e., partial polymerization similar to B-staging, had progressed sufficiently to prevent dripping under slight pressure at 25° C. If dripping occurred, specimens were considered to have failed. After 3 weeks the impregnated felt samples were evaluated for retention of flexibility by being bent 180° and observed for cracking along the crease. Samples that were too rigid to be bent or samples that would crack were considered to have failed. The impregnated felt samples were then evaluated for run out characteristics by being suspended in an oven at 125° C. and observed for dripping. Samples that exhibited any run out at this temperature were considered to have failed.

The sample compositions that passed the 125° C. run out test were used to again impregnate ⅛"×2"×4" Dacron felt spacer substrates. These impregnated felt samples were then cured for 16 hours at 125° C. and qualitatively examined for rigidity while hot by attempts to bend them. At this stage the samples had to be rigid to pass. The sample compositions that had cured were then examined for flow and shrinkage characteristics. Again, Dacron spacers were impregnated, and the felt samples were then compressed between 6"×1" copper bars, ¼" apart, an environment like that in a generator and similar to FIG. 2 of the drawings. After curing at 125° C. for 16 hours, the impregnated spacer substrates were examined for development of shrinkage gaps between the copper bars and qualitatively for resin flow. Here, a slight degree of resin flow was considered desirable, since it indicated that the spacers will conform and adhere to the generator coils. The formulation samples which cured, exhibited no gaps from shrinkage but adequate flow at 125° C. were then tested for heat distortion temperatures as described in ASTM D684-56, but instead using a Perkin Elmer Model TMS-2 Thermomechanical System. A flat tip, 0.035" diameter compression probe under a load of 111 gr. was employed to simulate a force of 264 lb./sq. in. The results are shown in Table 1 below:

TABLE 1

| Sample | Ingredients | Parts by wt. | Viscosity (Stokes) 0 hrs | Viscosity (Stokes) 3 hrs | Run Out (during first 24 hrs at 25° C.) | 180° C. Flexibility 3 wks. 25° C. | Run Out (after 3 wks) at 125° C. | Cured 16 hrs at 125° C. | Slight Flow During Cure 16 hrs at 125° C. | Shrinkage Test Formation of Gaps 16 hrs at 125° C. | Heat Distortion Temp. |
|---|---|---|---|---|---|---|---|---|---|---|---|
| (A) | DAIP | 50.0 | 46 | 99 | minimal | yes | no | yes | yes | none | >250° C. |
|  | DAIP—PP | 22.5 | | | | | | | | | |
|  | ITP667 | 7.6 | | | | | | | | | |
|  | TGA | 1.7 | | | | | | | | | |
|  | t-BPB | 1.5 | | | | | | | | | |
| (B) | DAIP | 50.0 | 46 | 81 | minimal | yes | no | yes | yes | none | >250° C. |
|  | DAIP—PP | 22.5 | | | | | | | | | |
|  | ITP444 | 3.8 | | | | | | | | | |
|  | TGA | 1.3 | | | | | | | | | |
|  | t-BPB | 1.5 | | | | | | | | | |
| (C) | DAIP | 50.0 | 41 | 81 | minimal | yes | no | yes | yes | none | >250° C. |
|  | DAIP—PP | 22.5 | | | | | | | | | |

TABLE 1-continued

| Sample | Ingredients | Parts by wt. | Viscosity (Stokes) 0 hrs | Viscosity (Stokes) 3 hrs | Run Out (during first 24 hrs at 25° C.) | 180° C. Flexibility 3 wks. 25° C. | Run Out (after 3 wks) at 125° C. | Cured 16 hrs at 125° C. | Slight Flow During Cure 16 hrs at 125° C. | Shrinkage Test Formation of Gaps 16 hrs at 125° C. | Heat Distortion Temp. |
|---|---|---|---|---|---|---|---|---|---|---|---|
| (D) | ITP565 | 7.8 | | | | | | | | | |
| | 1,4-BD | 0.3 | | | | | | | | | |
| | TMP | 0.3 | | | | | | | | | |
| | t-BPB | 1.5 | | | | | | | | | |
| | DAIP | 50.0 | 41 | 81 | minimal | yes | no | yes | yes | none | >250° C. |
| | DAIP—PP | 22.5 | | | | | | | | | |
| | ITP565 | 7.8 | | | | | | | | | |
| | 1,4-BD | 0.6 | | | | | | | | | |
| | t-BPB | 1.5 | | | | | | | | | |

The weight ratio of diallyl isophthalate monomer (DAIP)-diallyl isophthalate prepolymer (DAIP-PP); the number of NCO equivalents from the isocyanate terminated prepolymer (ITP)/100 g. of DAIP plus DAIP-PP; and the ratio of NCO groups from the isocyanate terminated prepolymer (ITP)/active groups in the chain extender, either OH groups from the 1,4-butane diol (1,4-DB) or trimethylol propane (TMP) or $NH_2$ groups from the trimethylene glycol di-p-aminobenzoate (TGA), are shown in Table 2 below:

TABLE 2

| Sample | Wt. Ratio DAIP:DAIP—PP | Equiv. NCO/100 g. DAIP plus DAIP—PP | Ratio NCO/active group in chain extender |
|---|---|---|---|
| (A) | 2.22:1 | 0.0157 | 1.05 |
| (B) | 2.22:1 | 0.0118 | 1.03 |
| (C) | 2.22:1 | 0.0190 | 1.03 |
| (D) | 2.22:1 | 0.0190 | 1.03 |

EXAMPLE 2

For comparative purposes, to see the effects on properties using an all epoxy, an all diallyl isophthalate, a mixture of epoxy and diallyl isophthalate, and use of various ratios outside the ranges of the compositions of this invention, five additional comparative samples (E) through (I) were made. In Sample (E), a low viscosity diglycidyl ether of bisphenol A resin, having an epoxy equivalent weight of 182 to 189 and a viscosity at 25° C. of 7,000 cps. to 10,000 cps. (sold commercially under the tradename DER 330 by Dow Chemical Co.) was mixed on a hotplate with isobutyl-4-chloro-3,5-diaminobenzoate chain extender (ICA), having an amine equivalent weight of 121 and a melting range of 85° C. to 90° C. In Sample (F), t-BPB was added to DAIP after which DAIP-PP was dissolved in the mixture.

In Sample (G), t-BPB was added to DAIP after which DAIP-PP was dissolved in the mixture, followed by stirring in a liquid diglycidyl ether of bisphenol A resin, having an epoxy equivalent weight of 172 to 176 and a viscosity at 25° C. of 4,000 cps. to 5,000 cps. (sold commercially under the tradename DER 332 by Dow Chemical Co.) and then adding a $BF_3$-amine complex curing agent ($BF_3A$) consisting of 14% $BF_3$-p-chloroaniline, 10.5% p-chloroaniline and 75.5% triethylene glycol. In Sample (H), TGA was initially added to DAIP while heating on a hotplate until the TGA melted and dissolved in the DAIP. Then t-BPB was mixed in. Next, DAIP-PP was dissolved in the mixture, and finally ITP667 was dissolved into the admixture. In Sample (I), TGA was added to DAIP after which t-BPB, DAIP-PP and ITP444 were mixed into the mixture.

The viscosity was measured and Dacron felt spacer substrates were impregnated as in Example 1 above. The same tests using the same methods as in Example 1 provided results shown in Table 3 below:

TABLE 3

| Sample | Ingredients | Parts by wt. | Viscosity (Stokes) 0 hrs | Viscosity (Stokes) 3 hrs | Run Out (during first 24 hrs at 25° C.) | 180° C. Flexibility 3 wks. 25° C. | Run Out (after 3 wks) at 125° C. | Cured 16 hrs at 125° C. | Slight Flow During Cure 16 hrs at 125° C. | Shrinkage Test Formation of Gaps 16 hrs at 125° C. | Heat Distortion Temp. |
|---|---|---|---|---|---|---|---|---|---|---|---|
| (E) | DER 330 | 61.7 | | | minimal | yes | high | | | | |
| | ICA | 30.3 | | | | | | | | | |
| (F) | DAIP | 50.0 | | | minimal | yes | yes | | | | |
| | DAIP—PP | 20.0 | | | | | | | | | |
| | t-BPB | 1.4 | | | | | | | | | |
| (G) | DAIP | 50.0 | | | minimal | yes | yes | | | | |
| | DAIP—PP | 22.5 | | | | | | | | | |
| | DER 332 | 15.0 | | | | | | | | | |
| | BF3A | 0.3 | | | | | | | | | |
| (H) | DAIP | 50.0 | 46 | 170+ | minimal | yes | no | yes | yes | none | >250° C. |
| | DAIP—PP | 22.5 | | | | | | | | | |
| | ITP667 | 11.4 | | | | | | | | | |
| | TGA | 2.6 | | | | | | | | | |
| | t-BPB | 1.5 | | | | | | | | | |
| (I) | DAIP | 50.0 | 46 | 148+ | minimal | yes | no | yes | yes | none | >250° C. |
| | DAIP—PP | 22.5 | | | | | | | | | |
| | ITP444 | 7.5 | | | | | | | | | |
| | TGA | 2.55 | | | | | | | | | |
| | t-BPB | 1.5 | | | | | | | | | |

The weight ratio of diallyl isophthalate monomer (DAIP):diallyl isophthalate prepolymer (DAIP-PP); the number of NCO equivalents from the isocyanate terminated prepolymer (ITP)/100 gr. of DAIP plus DAIP-PP; and the ratio of NCO groups from the isocyanate terminated prepolymer (ITP)/active groups in the chain extender, either OH groups from the 1,4-butane diol (1,4-DB) or trimethylol propane (TMP) or $NH_2$ groups from the trimethylene glycol di-p-aminobenzoate (TGA), are shown in Table 4 below:

TABLE 4

| Sample | Wt. Ratio DAIP:DAIP—PP | Equiv. NCO/100 g. DAIP plus DAIP—PP | Ratio NCO/ active group in chain extender |
|---|---|---|---|
| (E) | ** | ** | ** |
| (F) | 2.5:1 | ** | ** |
| (G) | 2.22:1 | ** | ** |
| (H) | 2.22:1 | 0.0236 | 1.04 |
| (I) | 2.22:1 | 0.0233 | 1.04 |

**not applicable

As can be seen from the results of Tables 1 through 4, a single resin system such as Samples (E) and (F) would appear to allow run out at curing temperatures even after three weeks of air setting. Such run out at this time would result in substantial resin loss resulting in less vibration damping and less control of the forces which could result from a short-circuit condition. Pools of resin would also drip over other parts of the apparatus which could cause a variety of problems. As Sample (G) shows, not every combination of two resins will provide adequate control of resin flow.

Even with the use of diallyl isophthalate monomer and prepolymer in combination with an isocyanate terminated prepolymer, a strict relationship exists between the ratio of Equivalent NCO to amount of total diallyl isophthalate, as shown in Tables 3 and 4, Samples (H) and (I). Use of too high a ratio results in high viscosities at 3 hours, posing pot-life and impregnation problems, in addition to providing high moisture absorption and poor hydrolytic stability which adversely affect electrical properties.

Samples (A) through (D), the compositions of this invention, provide good impregnating viscosity and pot-life, and no run out at curing temperature, while also providing adequate flow with no shrinkage upon compression between conductors. Heat distortion temperatures of Samples (A) through (D) are also excellent. Thus, the composition of this invention provides a gellable, compatible combination of diallyl isophthalate, with physical but not chemical interaction, to prevent free flow of the diallyl isophthalate. Such a system would be excellent as a gellable impregnating resin for insulating, damping, felt spacers, between conductors in an electrical apparatus subject to stress and vibration.

With reference to Tables 2 and 4, some sample calculations are provided below. For Sample (A): Equiv. NCO/100 g. DAIP plus DAIP-PP=7.6 g. isocyanate terminated prepolymer/667 equiv. wt. of isocyanate terminated prepolymer=0.01139 per 72.5 g. DAIP plus DAIP-PP or 0.0157 per 100 g. DAIP plus DAIP-PP. For Sample (A): Ratio NCO/active groups in chain extender=(0.0157 Equiv. NCO/100 g. DAIP plus DAIP-PP) divided by (1.7 TGA/157 amine equiv. wt. of TGA for each 72.5 g. DAIP plus DAIP-PP or 0.0149 equivalents $NH_2$ per 100 g. DAIP plus DAIP-PP)=0.0157/0.0149=1.05.

We claim:

1. A fluid, gellable resin system impregnated into a porous substrate, said substrate being disposed between stator conductor coils in the end winding area of an electrical apparatus, wherein said resin system consists essentially of:
   (A) a liquid diallyl isophthalate mixture comprising the admixture of liquid diallyl isophthalate monomer and solid diallyl isophthalate prepolymer, where the ratio of monomer:prepolymer is between about 1.5:1 and about 3.0:1,
   (B) an amount of isocyanate terminated polyurethane prepolymer effective to provide between about 0.010 and about 0.020 equivalent of NCO group per 100 grams of liquid diallyl isophthalate mixture, where the isocyanate component is selected from the group consisting of 2,4-tolylene diisocyanate; 2,6-tolylene diisocyanate; mixtures of 2,4-tolylene diisocyanate and 2,6-tolylene diisocyanate; and 4,4'-diphenyl methane diisocyanate,
   (C) a chain extender for the isocyanate terminated polyurethane prepolymer consisting of trimethylene glycol di-p-aminobenzoate when the isocyanate component contains tolylene diisocyanate; and selected from hydroquinone di-($\beta$-hydroxyethyl) ether; ethylene glycol; 1,2-propanediol; 1,3-propanediol; 1,5-pentanediol; 1,4-butanediol; 1,3-butanediol; 1,2-butanediol; 2,2-butanediol; 2,3-butanediol, mixtures thereof, and mixtures with triols when the isocyanate component contains 4,4'-diphenyl methane diisocyanate, and
   (D) a peroxide catalyst for the liquid diallyl isophthalate mixture, where the resin system is curable with the application of heat.

2. The resin system of claim 1, where the resin is characterized as having the properties of a viscosity of up to about 120 stokes at 25° C. after 3 hours, no resin runout from the substrate after 3 weeks when cured at 125° C., and a heat distortion temperature upon cure of over about 200° C.

3. A stator end winding spacer system, located in the end winding section of an electrical apparatus, comprising spacers disposed between a plurality of stator end winding conductor coils, said spacers having impregnated therein a cured resin system comprising the admixture of:
   (A) a liquid diallyl isophthalate mixture comprising the admixture of liquid diallyl isophthalate monomer and solid diallyl isophthalate prepolymer, where the weight ratio of monomer:prepolymer is between about 1.5:1 and about 3.0:1,
   (B) an amount of chain forming isocyanate terminated polyurethane prepolymer effective to provide a chain network which physically interpenetrates the liquid diallyl isophthalate mixture and prevents free flow of the liquid diallyl isophthalate mixture,
   (C) a chain extender for the isocyanate terminated polyurethane prepolymer, and
   (D) a catalyst for the liquid diallyl isophthalate mixture, where the resin system is curable with the application of heat.

4. The resin system of claim 1, where the solid diallyl isophthalate prepolymer has a weight average molecular weight of between about 200,000 and about 300,000, and contains unreacted pendant allyl groups, and where the weight ratio of diallyl isophthalate monomer:prepolymer is between about 2.0:1 and about 2.5:1.

5. The resin system of claim 1, where the isocyanate terminated polyurethane prepolymer is present in an amount effective to provide between about 0.010 and about 0.020 equivalent of NCO group per 100 grams of liquid diallyl isophthalate mixture, and the isocyanate terminated prepolymer has a weight average molecular weight of between about 700 and about 2,500.

* * * * *